(12) United States Patent
Kitagawa

(10) Patent No.: US 10,642,013 B2
(45) Date of Patent: May 5, 2020

(54) SPECIMEN OBSERVATION APPARATUS

(71) Applicant: OLYMPUS CORPORATION, Shibuya-ku, Tokyo (JP)

(72) Inventor: Hisao Kitagawa, Hino (JP)

(73) Assignee: OLYMPUS CORPORATION, Tokyo (JP)

(*) Notice: Subject to any disclaimer, the term of this patent is extended or adjusted under 35 U.S.C. 154(b) by 288 days.

(21) Appl. No.: 14/694,555

(22) Filed: Apr. 23, 2015

(65) Prior Publication Data
US 2015/0316757 A1 Nov. 5, 2015

(30) Foreign Application Priority Data

Apr. 30, 2014 (JP) ................. 2014-093517

(51) Int. Cl.
G02B 21/00 (2006.01)
G02B 21/36 (2006.01)
H04N 5/225 (2006.01)
G02B 27/58 (2006.01)
G01N 21/64 (2006.01)

(52) U.S. Cl.
CPC ..... G02B 21/0076 (2013.01); G01N 21/6458 (2013.01); G02B 21/008 (2013.01); G02B 21/0044 (2013.01); G02B 21/0048 (2013.01); G02B 21/361 (2013.01); G02B 21/367 (2013.01); G02B 27/58 (2013.01); H04N 5/2254 (2013.01)

(58) Field of Classification Search
None
See application file for complete search history.

(56) References Cited

U.S. PATENT DOCUMENTS 4,945,478 A * 7/1990 Merickel ............... A61B 5/055
382/131
7,136,518 B2 * 11/2006 Griffin ................. A61B 5/0059
382/133
(Continued)

FOREIGN PATENT DOCUMENTS

EP 1586931 A2 10/2005
EP 1906224 A1 4/2008
(Continued)

OTHER PUBLICATIONS

Michalet, X., et al., "Development of new photon-counting detectors for single-molecule fluorescence microscopy", Phil. Trans. R. Soc. B 368, pp. 1-22 (2013).*

(Continued)

Primary Examiner — Lindsay J Uhl
(74) Attorney, Agent, or Firm — Holtz, Holtz & Volek PC

(57) ABSTRACT

A superior superresolution image can be generated. Provided is a specimen observation apparatus including an objective lens that radiates excitation laser light emitted from a light source onto a specimen; and a main controller that obtains a plurality of sets of image data of the same region on the specimen by repeatedly detecting fluorescence from the same region on the specimen irradiated with the excitation laser light by the objective lens, and that emphasizes high-frequency components in an addition image data obtained by adding the obtained plurality of sets of image data of the same region on the specimen.

22 Claims, 5 Drawing Sheets

(56) References Cited

U.S. PATENT DOCUMENTS

| | | | |
|---|---|---|---|
| 7,561,326 B2 | 7/2009 | Funk et al. | |
| 7,593,581 B2 | 9/2009 | Hecht et al. | |
| 8,780,192 B2 | 7/2014 | Hayashi | |
| 8,817,088 B2 | 8/2014 | Hayashi | |
| 8,933,418 B2 | 1/2015 | Hayashi | |
| 9,111,366 B2* | 8/2015 | Enderlein | G02B 21/367 |
| 2004/0000639 A1 | 1/2004 | Storz | |
| 2004/0208385 A1* | 10/2004 | Jiang | A61B 5/0059 |
| | | | 382/254 |
| 2005/0225849 A1 | 10/2005 | Gouch | |
| 2006/0011860 A1 | 1/2006 | Hecht et al. | |
| 2006/0012871 A1 | 1/2006 | Funk et al. | |
| 2009/0010504 A1 | 1/2009 | Okugawa et al. | |
| 2009/0206257 A1* | 8/2009 | Gunji | H01J 37/28 |
| | | | 250/310 |
| 2009/0213238 A1* | 8/2009 | Hara | H04N 5/262 |
| | | | 348/222.1 |
| 2010/0067103 A1* | 3/2010 | Sangu | G02B 21/16 |
| | | | 359/385 |
| 2013/0015366 A1* | 1/2013 | Hayashi | G01N 21/6458 |
| | | | 250/458.1 |
| 2013/0107359 A1* | 5/2013 | Redford | G02B 7/005 |
| | | | 359/385 |
| 2013/0314758 A1 | 11/2013 | Hellmich et al. | |
| 2013/0342674 A1* | 12/2013 | Dixon | G02B 21/36 |
| | | | 348/79 |
| 2014/0361154 A1 | 12/2014 | Hayashi | |
| 2016/0171658 A1* | 6/2016 | Matson | G06T 3/4053 |
| | | | 382/299 |
| 2016/0238827 A1* | 8/2016 | Shroff | G02B 21/0032 |
| 2016/0252718 A1* | 9/2016 | Hartell | G02B 21/367 |
| | | | 382/299 |

FOREIGN PATENT DOCUMENTS

| | | | |
|---|---|---|---|
| GB | 2416263 A | 1/2006 | |
| JP | H10260132 A | 9/1998 | |
| JP | H11271636 A | 10/1999 | |
| JP | 2001117013 A | 4/2001 | |
| JP | 2005181380 A | 7/2005 | |
| JP | 2005292839 A | 10/2005 | |
| JP | 2006031004 A | 2/2006 | |
| JP | 2006072330 A | 3/2006 | |
| JP | 2006259377 A | 9/2006 | |
| JP | 2008152011 A | 7/2008 | |
| JP | 2008197283 A | 8/2008 | |
| JP | 2010266452 A | 11/2010 | |
| JP | 2011112780 A | 6/2011 | |
| JP | 2012078408 A | 4/2012 | |
| JP | 2013020083 A | 1/2013 | |
| JP | 2013205231 A | 10/2013 | |
| JP | 2014240870 A | 12/2014 | |
| WO | 2011135049 A1 | 11/2011 | |
| WO | WO 2011135049 A1 * | 11/2011 | G01N 21/6408 |

OTHER PUBLICATIONS

Michalet, X., et al., "Development of new photon-counting detectors for single-molecule fluorescence microscopy", Phil. Trans. R. Soc. B 368, pp. 1-22 (2013) (Year: 2013).*
Extended European Search Report dated Aug. 27, 2015, issued in counterpart European Application No. 15165634.5.
Japanese Office Action dated Oct. 31, 2017 issued in counterpart Japanese Application No. 2014-093517.
European Office Action dated Aug. 8, 2019 issued in counterpart European Application No. 15165634.5.
Haasdonk, et al., "Digitale Bildverarbeitung Einheit 7 Bildarithmetik", XP055610377, URL: https://lmb.informatik.uni-freiburg.de/people/haasdonk/DBV_FHO/DBV_FHO_2005_E07.pdf.
Notice of Dispatch of Duplicates of a Written Opinion dated Oct. 28, 2019 (and partial English translation thereof) issued in Japanese Patent No. 6355961.
Pawley, "Handbook of Biological Confocal Microscopy", Springer Science+Business Media, LLC, New York, U.S., Third Edition, pp. 34-37 and 386-387.
Notice of Dispatch of Duplicates of a Written Opposition dated Feb. 13, 2019 (and partial English translation thereof) issued in Japanese Patent No. 6355961.
Notice of Dispatch of Duplicates of a Written Opposition dated Oct. 28, 2019 (and partial English translation thereof) issued in Japanese Patent No. 6355961.
Notice of Reasons for Revocation dated Apr. 11, 2019 (and partial English translation thereof) issued in Japanese patent No. 6355961.
Notice of Reasons for Revocation dated Oct. 28, 2019 (and partial English translation thereof) issued in Japanese patent No. 6355961.
Pawley, "Handbook of Biological Confocal Microscopy", Springer Science+Business Media, LLC, New York, U.S., Edition, pp. 1, 4-12, 20, 21, 41, 54, 386, 488, 489, 631, and 632.
Pawley, "Handbook of Biological Confocal Microscopy", Springer Science+Business Media, LLC, New York, U.S., Edition, pp. 34-36 and 386-387.
Zhao, M.D., Ph.D., "Confocal Microscopy Tutorial: Part 3 Operation, Optimizationof Leica SP2 LSCM", Advanced Microscopy Unit, Department of Pathology, Haartman Institute, University of Helsinki; retrieved from internet: <http://www.hi.helsinki.fi/amu/AMU%20Cf_tut/Opt_average.htm>.

* cited by examiner

SPECIMEN OBSERVATION APPARATUS

CROSS-REFERENCE TO RELATED APPLICATIONS

This application is based on Japanese Patent Application No. 2014-093517, the contents of which are incorporated herein by reference.

TECHNICAL FIELD

The present invention relates to a specimen observation apparatus.

BACKGROUND ART

Since the deciphering of the human genome, the pathogenesis of cancer etc., and the mechanisms of genesis/specialization of individual organs, like the heart and cranial nerves, are being unraveled at the molecular level. Thus, when examining biological samples such as cells by using microscopes, there is a demand to observe their behavior at the level of molecules, such as proteins, DNA/RNA, and so forth. To achieve this, superresolution observation that goes beyond optical resolution is becoming increasingly important.

In the related art, as an apparatus that performs superresolution observation, there is a known specimen observation apparatus that generates a superresolution image in which superresolution components are visualized by emphasizing high-frequency components in image data of a specimen via image computational processing (for example, see Patent Literature 1 and Patent Literature 2).

CITATION LIST

Patent Literature

{PTL 1}
Japanese Unexamined Patent Application, Publication No. 2012-78408
{PTL 2}
Japanese Unexamined Patent Application, Publication No. 2013-20083

SUMMARY OF INVENTION

In cases where the high-frequency components in the image data of a specimen are emphasized, as with the specimen observation apparatuses described in Patent Literature 1 and Patent Literature 2, when the proportion of high-frequency components in the image data is small, it is not possible to efficiently emphasize the high-frequency components, and it is not possible to generate a superior superresolution image.

The present invention provides a specimen observation apparatus with which it is possible to generate a superior superresolution image.

An aspect of the present invention is a specimen observation apparatus including an objective lens that radiates laser light emitted from a light source onto a specimen; an image-data obtaining portion that detects return light from the specimen irradiated with the laser light by the objective lens and that obtains image data; a control portion that repeatedly detects the return light from the same region on the specimen with the image-data obtaining portion and that obtains a plurality of sets of the image data for the same region; an image-data processing portion that adds the plurality of sets of the image data for the same region, obtained by the image-data obtaining portion; and an image computational processing portion that emphasizes high-frequency components in the addition image data obtained by the image-data processing portion.

With this aspect, the laser light emitted from the light source is irradiated onto the specimen by the objective lens, and the return light returning from the specimen is detected by the image-data obtaining portion, so that image data of the specimen is obtained. Then, by means of the control portion, a plurality of sets of image data for the same region on the specimen, obtained by repeatedly detecting the return light with the image-data obtaining portion, are added by the image-data processing portion.

By doing so, for the same region on the specimen, even in the case where an adequate level of light is not obtained with a single irradiation with the laser light, and noise is superimposed on the image data, an image having a high proportion of high-frequency components, in which the luminance is increased by virtue of the addition of the image data, and the noise is smoothed out, is obtained. Therefore, by performing image computational processing with the image computational processing portion on the image obtained by the image-data processing portion, serving as a raw image, it is possible to generate a superior superresolution image in which the high-frequency components in the raw image are efficiently emphasized so that superresolution components are visualized.

The aspect described above may further include a confocal aperture portion that has an opening at a position that is optically conjugate with a focal position of the objective lens; and a confocal lens that focuses return light from the specimen irradiated with the laser light by the objective lens and that projects a spot of the return light at the opening position of the confocal aperture portion, wherein the opening of the confocal aperture portion has a diameter smaller than the diameter of the spot of return light projected by the confocal lens.

With this configuration, since only the central portion of the return light is passed by the confocal aperture portion, and the surrounding portion is blocked, image data having a high proportion of high-frequency components is obtained by the image-data obtaining portion, and a raw image having a further improved proportion of high-frequency components for the same region of the specimen is obtained by the image-data processing portion. Accordingly, by means of image computational processing, it is possible to generate a superior superresolution image in which the high-frequency components in the raw image are efficiently emphasized so that the superresolution components are visualized.

The aspect described above may further include a scanning portion that scans the laser light, irradiated onto the specimen by the objective lens, on the specimen in a main scanning direction and a sub-scanning direction that intersects therewith, wherein the control portion repeats an operation in which, after the laser light is repeatedly scanned on the same scanning line in the main scanning direction by the scanning portion for a prescribed number of times, the position thereof in the sub-scanning direction is changed so as to move to the next scanning line, and a plurality of sets of image data for the same scanning line are obtained by the image-data obtaining portion.

With this configuration, even when using cells as the specimen, it is possible to prevent the occurrence of phototoxicity or fluorescence saturation since the laser light is not continuously radiated onto a single point. In addition, since the time intervals at which the same region is repeatedly scanned are not excessively long, the influence of temporal variations in the cells or temperature drift of the apparatus can be reduced. Therefore, by means of the image-data processing portion, it is possible to generate a raw image having a small amount of noise and a high proportion of high-frequency components.

If the image data is obtained by repeatedly detecting the return light from the same region of the specimen in units of single pixels, since the laser light continuously irradiates a single point on the specimen, the influence of phototoxicity becomes noticeable, and in addition, the fluorescent molecules tend to become saturated. On the other hand, if the image data is obtained by repeatedly detecting the return light from the specimen in units of single image frames, the influence of temporal variations in the cells or the temperature drift of the apparatus becomes large, and the image data for the same region of the specimen changes.

In the aspect described above may further include the light source that emits line-shaped laser light, wherein the image-data obtaining portion may include an image-acquisition device formed in the shape of a line, which acquires an image of the return light that returns from the specimen irradiated with the line-shaped laser light.

With this configuration, the region in which the line-shaped laser light emitted from the light source is radiated in the form of a line by the objective lens can be regarded as being equivalent to a scanning line in the main scanning direction using a scanner. Therefore, with the image-data processing portion, by adding the plurality of sets of image data obtained by repeatedly detecting the return light from the same line-illuminated region on the specimen with an image-acquisition device formed in the shape of a line, it is possible to easily generate an addition image having a high proportion of high-frequency components without using a scanner.

The aspect described above may further include a mask that has openings in the shape of slits or pinholes arranged periodically and that restricts the laser light incident on the objective lens; and a driving portion that rotates the mask at high speed about a center axis thereof, wherein the image-data obtaining portion includes a two-dimensional image-acquisition device that acquires an image of the return light returning from the specimen.

With this configuration, by rotating the mask at high speed with the driving portion, the laser light that passes through the opening of the mask and that is radiated onto the specimen by the objective lens is scanned without using a scanner. In addition, image data for the scanning region of the specimen on which the laser light is scanned is obtained by the two-dimensional image-acquisition device. Therefore, by adding, with the image-data processing portion, the plurality of sets of image data for a single frame, obtained by the two-dimensional image-acquisition device, it is possible to easily generate an addition image in which the proportion of high-frequency components is high.

A second aspect of the present invention is a specimen observation apparatus including a scanning mirror that scans laser light emitted from a light source on a specimen; an objective lens that radiates the laser light scanned by the scanning mirror onto the specimen; a light detector that detects return light from the specimen irradiated with the laser light and that outputs a signal according to a light level thereof; and a controller that generates image data of the specimen by using the signal output from the light detector, wherein the controller performs processing for generating a plurality of sets of the image data for the same position by controlling the scanning mirror so as to repeatedly scan the laser light a plurality of times at the same position on the specimen, processing for adding the generated plurality of sets of image data for the same position, and processing for emphasizing high-frequency components in an addition image data obtained by the adding.

In the aspect described above, the scanning mirror may include at least one galvanometer mirror that deflects the laser light in a main scanning direction and a sub-scanning direction, which intersect each other, wherein the controller may control the scanning mirror so as to repeatedly perform an operation in which, after the laser light is repeatedly scanned on the same scanning line in the main scanning direction a prescribed number of times, the position thereof in the sub-scanning direction is changed so as to move to the next scanning line.

A third aspect of the present invention is a specimen observation apparatus including an objective lens that radiates excitation light emitted from a light source onto a specimen; a mask that is disposed on the light source side of the objective lens and that has openings in the shape of slits or pinholes which are periodically arranged; a motor that rotates the mask about a prescribed rotation axis; a two-dimensional image-acquisition device that acquires an image of return light from the specimen irradiated with the excitation light via the rotating mask; and a controller that performs processing for repeatedly obtaining and adding the images of the same region on the specimen, obtained by the two-dimensional image-acquisition device, and processing for emphasizing high-frequency components in addition image data obtained by the adding.

The present invention affords the advantage that it is possible to generate a superior superresolution image.

DESCRIPTION OF EMBODIMENT

Figure 1:
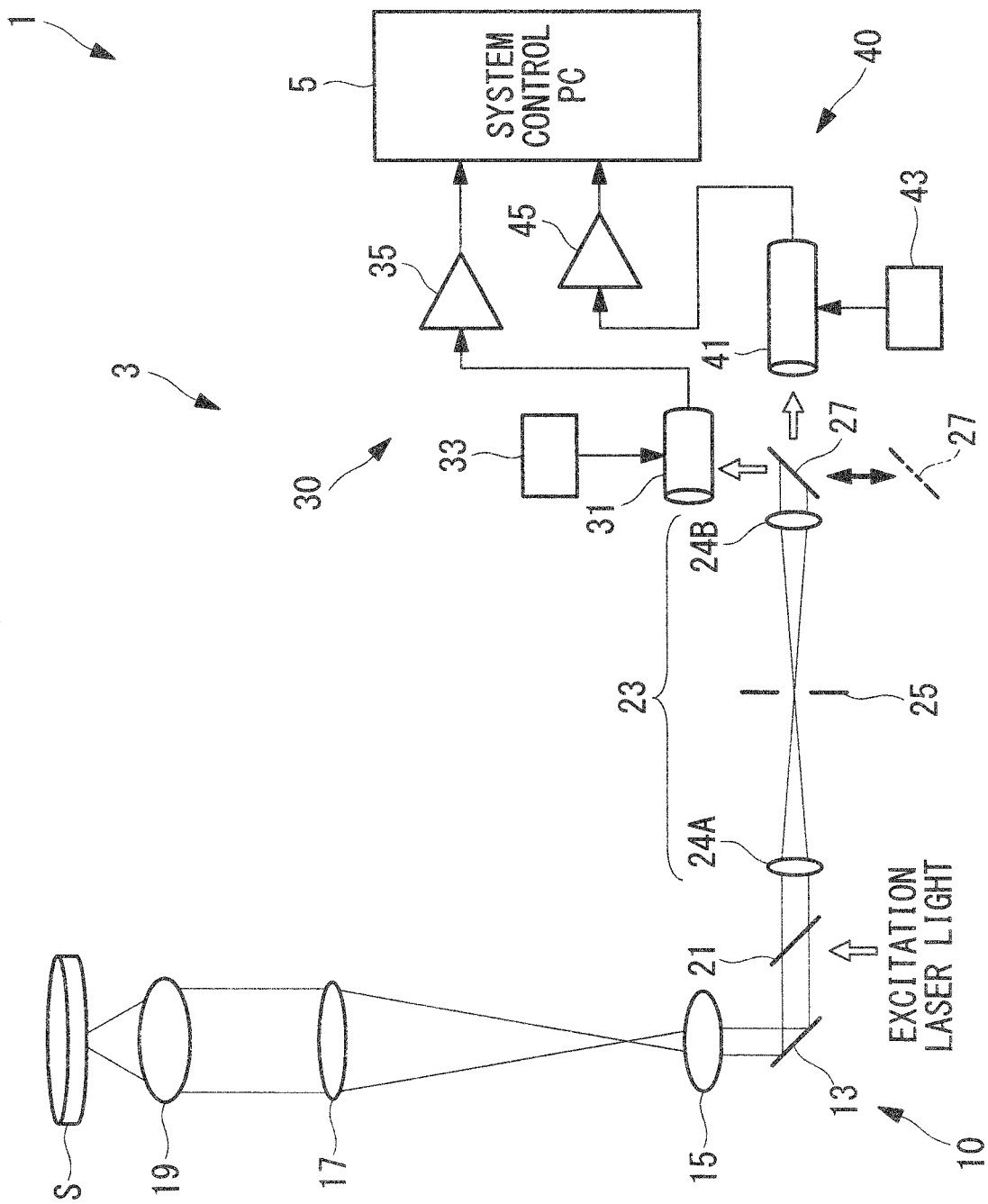
FIG. 1 is a diagram showing, in outline, the configuration of a specimen observation apparatus according to an embodiment of the present invention.

A specimen observation apparatus according to an embodiment of the present invention will be described below with reference to the drawings.

As shown in FIGS. 1 to 5, the specimen observation apparatus 1 according to this embodiment includes a scanning laser microscope 3 and a system control PC (Personal Computer) 5 that performs control and so forth of the scanning laser microscope 3.

The scanning laser microscope 3 includes a microscope main unit 10 that radiates excitation laser light onto a specimen S, such as biological cellular tissue, and a first detection unit 30 and second detection unit 40 that detect fluorescence generated in the specimen S irradiated with the excitation laser light by the microscope main unit 10 to obtain light intensity signals.

The microscope main unit 10 includes a stage 11 (see FIGS. 3 to 5) on which the specimen S is mounted, a light source (not illustrated) that generates the excitation laser light, a scanner (scanning portion) 13 that scans the excitation laser light emitted from the light source, a pupil projection lens 15 that focuses the excitation laser light scanned by the scanner 13, an image-forming lens 17 that converts the excitation laser light focused by the pupil projection lens 15 into collimated light, and an objective lens 19 that radiates the excitation laser light converted into the collimated light onto the specimen S and that also collects the fluorescence generated in the specimen S.

In addition, the microscope main unit 10 includes a dichroic mirror 21 that splits off, from the light path, the fluorescence (return light) that is collected by the objective lens 19 and that returns along the light path of the excitation laser light via the image-forming lens 17, the pupil projection lens 15, and the scanner 13; relay lenses 23 that relay the fluorescence that is split off by the dichroic mirror 21; an aperture (confocal aperture portion) 25, having an opening at a position that is optically conjugate with the focal position of the objective lens 19; and a light-path switching mirror 27 that switches the light path of the fluorescence relayed by the relay lenses 23.

Figure 3:
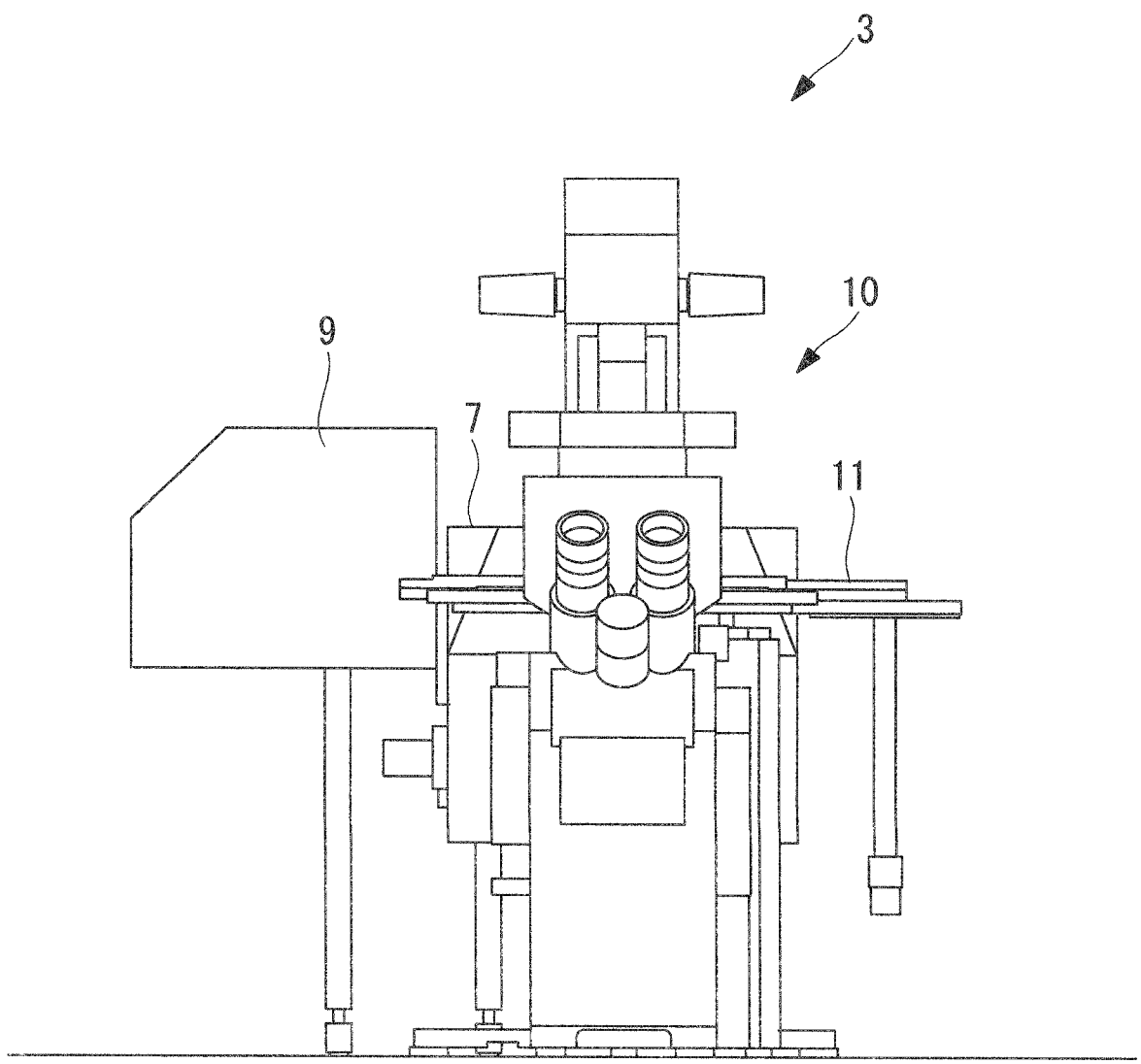
FIG. 3 is a view of a scanning laser microscope in FIG. 1, taken from the front.
Figure 4:
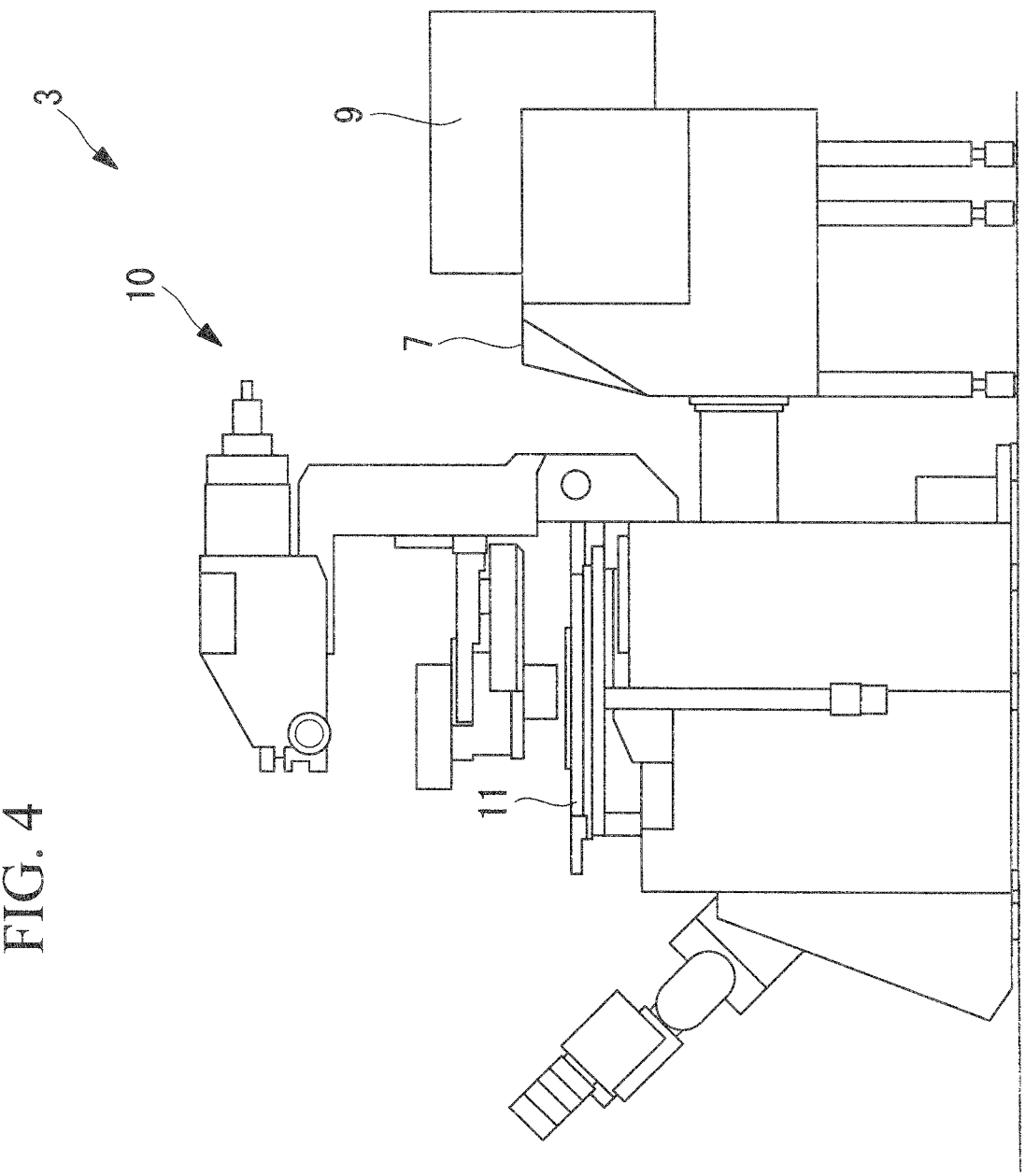
FIG. 4 is a view of the scanning laser microscope in FIG. 3, taken from the side.
Figure 5:
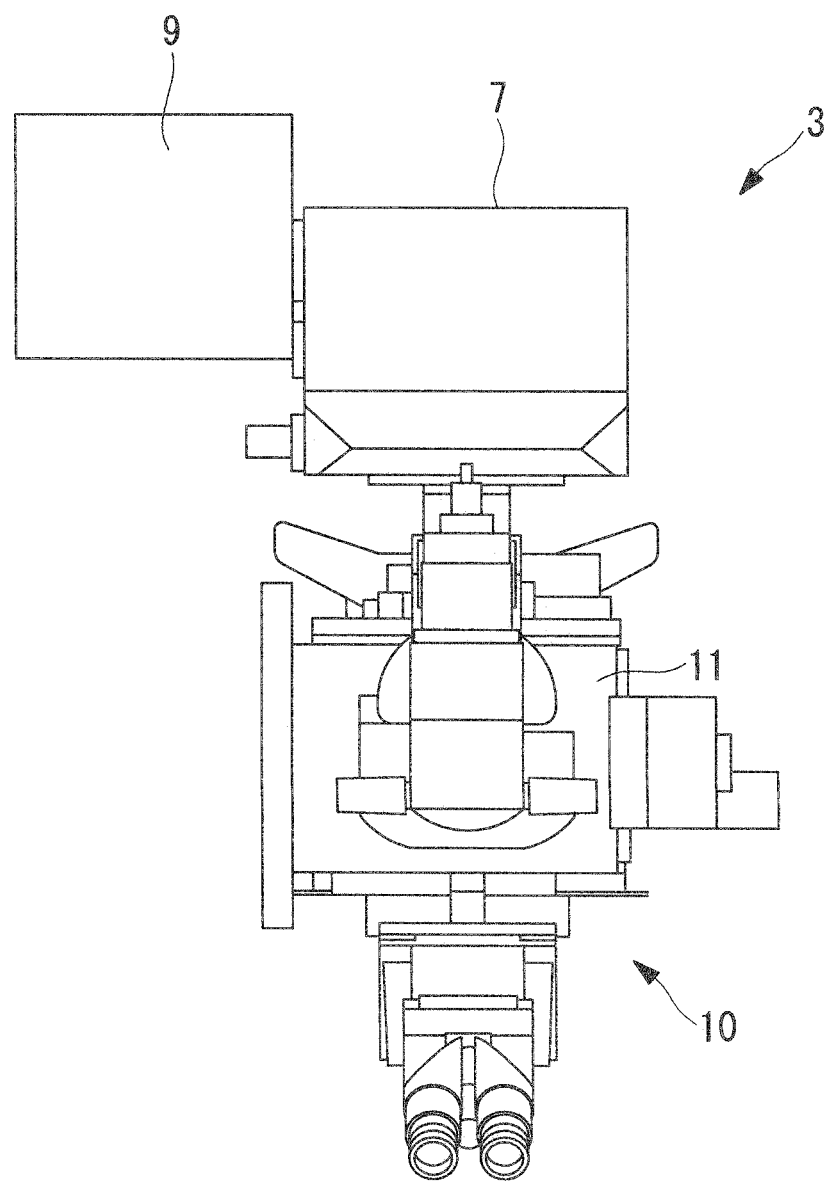
FIG. 5 is a view of the scanning laser microscope in FIG. 3, taken from above.

The scanner 13 is accommodated in a scanning unit (SU) 7 shown in FIGS. 3 to 5. The scanner 13 includes two galvanometer mirrors (not illustrated) that are disposed facing each other and that can oscillate about mutually perpendicular axes. By oscillating the two galvanometer mirrors to deflect the excitation laser light, the scanner 13 can two-dimensionally (X-axis direction and Y-axis direction) scan the excitation laser light on the specimen S.

The oscillating speed of one of the galvanometer mirrors is set to be sufficiently fast relative to the oscillating speed of the other galvanometer mirror. The higher-speed galvanometer mirror is used for scanning in the main scanning direction (X-axis direction) on the specimen S, and the lower-speed galvanometer mirror is used for moving the scanning position on the specimen S in the sub-scanning direction (Y-axis direction). These two galvanometer mirrors are configured to be capable of oscillating about their axes by motors, which are not illustrated.

The dichroic mirror 21 reflects the excitation laser light from the light source towards the scanner 13, and also transmits the fluorescence coming from the specimen S towards the relay lenses 23.

The relay lenses 23 are formed of a confocal lens 24A that converges the fluorescence transmitted through the dichroic mirror 21 and images and projects a fluorescence spot at the opening position of the aperture 25, and a detection-light guiding lens 24B that guides the fluorescence imaged and projected by the confocal lens 24A to the first detection unit 30 and the second detection unit 40.

The opening diameter of the aperture 25 can be changed via the system control PC 5. In this embodiment, the aperture 25 is set to an opening diameter slightly smaller than the diameter of the spot of fluorescence projected by the confocal lens 24A, that is, a confocal spot.

The light-path switching mirror 27 is disposed, in an insertable/removable manner, in the light path of the fluorescence relayed by the relay lenses 23. When the light-path switching mirror 27 is inserted into the light path of the fluorescence, the fluorescence from the relay lenses 23 is reflected towards the first detection unit 30. When the light-path switching mirror 27 is removed from the light path of the fluorescence, the fluorescence from the relay lenses 23 continues straight through and is incident on the second detection unit 40.

The first detection unit 30 is built into the scanning unit 7. This first detection unit 30 includes a multialkali PMT (Photomultiplier Tube, image-data obtaining portion) 31 that detects the fluorescence guided by the relay lenses 23 and outputs a light intensity signal of a magnitude according to the light level of that fluorescence; a first HV power supply 33 that applies an HV (High Voltage, applied voltage) to the multialkali PMT 31, and a first amplifier 35 that amplifies the light intensity signal output from the multialkali PMT 31.

The multialkali PMT 31 is a side-on PMT and includes a multialkali photoelectric surface (not illustrated) that receives and photoelectrically converts the fluorescence.

The second detection unit 40 is accommodated in a high-sensitivity detection unit (HSD: High Sensitivity Detectors) 9 shown in FIGS. 3 to 5. This second detection unit 40 includes a GaAsP-PMT (Gallium Arsenide Phosphide-PMT, image-data obtaining portion) 41 that detects the fluorescence guided by the relay lenses 23 and outputs a light intensity signal of a magnitude according to the light level of this fluorescence, a second HV power supply 43 that applies an HV to the GaAsP-PMT 41, and a second amplifier 45 that amplifies the light intensity signal output from the GaAsP-PMT 41.

The GaAsP-PMT 41 is a head-on PMT and includes a photoelectric surface (not illustrated) in which a GaAsP compound is used. This GaAsP-PMT 41 has a higher sensitivity than the multialkali PMT 31, giving lower noise in the image data.

Figure 2:
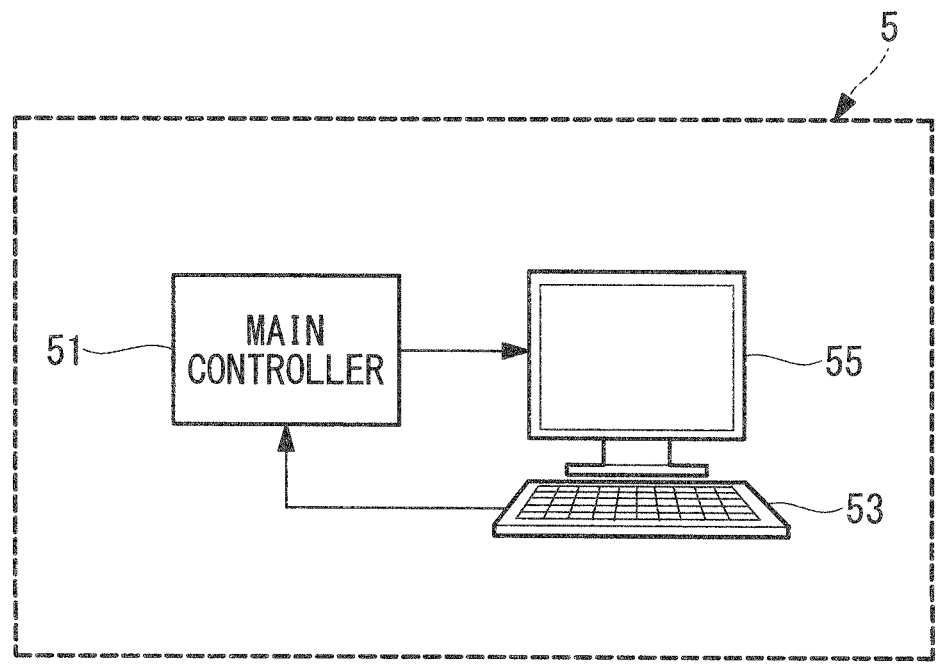
FIG. 2 is a diagram showing, in outline, the configuration of a system control PC in FIG. 1.

As shown in FIG. 2, the system control PC 5 includes a main controller (image-data obtaining portion, control portion, image-data processing portion, image computational processing portion) 51 that configures the apparatus, obtains image data, and performs processing and so forth, an input portion 53 that allows the user to input instructions to the main controller 51, and a monitor 55 that displays an image of the specimen and so forth.

The main controller 51 sets scanning conditions for the scanner 13, sets the opening diameter of the aperture 25, inserts/removes the light-path switching mirror 27, sets the amplification gains of the first amplifier 35 and the second amplifier 45, sets the HVs of the first HV power supply 33 and the second HV power supply 43, and so on, according to user instructions input via the input portion 53.

As well as controlling the scanner 13, the main controller 51 converts the light intensity signal sent from the first amplifier 35 or the second amplifier 45 to luminance information for each pixel, according to the scanning position of the scanner 13, to obtain image data of the specimen S. In addition, the main controller 51 displays the obtained image data on the monitor 55.

The main controller 51 obtains a plurality of sets of image data in the same region by repeatedly detecting the fluorescence from the same region on the specimen S by using the scanner 13 and the detection units 30 and 40. Specifically, the main controller 51 repeatedly scans the excitation laser light on the same scanning line in the main scanning direction with the higher-speed galvanometer mirror in the scanner 13, to obtain a plurality of sets of image data for the same scanning line.

The main controller 51 adds the obtained plurality of sets of image data for the same region on the specimen S to generate an addition image (addition image data). Then, with the generated addition image serving as a raw image, by applying image computational processing for emphasizing high-frequency components in the raw image, the main controller 51 generates a superresolution image in which the optical resolution is improved.

The operation of the specimen observation apparatus 1 configured in this way will now be described.

When obtaining image data of the specimen S with the specimen observation apparatus 1 according to this embodiment by using the multialkali PMT 31, the HV gain of the first HV power supply 33 and the amplifier gain of the first amplifier 35 are set by the main controller 51. Then, by means of the main controller 51, the light-path switching mirror 27 is inserted into the light path of the fluorescence, and the excitation laser light is emitted from the light source.

The excitation laser light emitted from the light source is reflected by the dichroic mirror 21 and is then deflected by the scanner 13, is focused by the pupil projection lens 15, is converted to collimated light by the image-forming lens 17, and is radiated onto the specimen S by the objective lens 19. The excitation laser light is two-dimensionally scanned on the specimen S according to the oscillating motion of the scanner 13.

The fluorescence generated in the specimen S by irradiation with the excitation laser light is collected by the objective lens 19, returns along the light path of the excitation laser light via the image-forming lens 17, the pupil projection lens 15, and the scanner 13, and is transmitted through the dichroic mirror 21, thus being split off from the light path. The fluorescence transmitted through the dichroic mirror 21 is relayed by the relay lenses 23, passes through the aperture 25, is reflected by the light-path switching mirror 27, and is incident on the first detection unit 30.

In the first detection unit 30, the fluorescence is detected by the multialkali PMT 31, and a light intensity signal of a magnitude according to the detected fluorescence level is output. The light intensity signal output from the multialkali PMT 31 is amplified by the first amplifier 35 and is sent to the main controller 51 in the system control PC 5.

In the main controller 51, the input light intensity signal is converted to luminance information for each pixel according to the scanning position of the scanner 13, and image data of the specimen S is obtained. The obtained image data is displayed on the monitor 55.

Next, when obtaining image data of the specimen S by using the GaAsP-PMT 41, the HV gain of the second HV power supply 43 and the amplifier gain of the second amplifier 45 are set by the main controller 51. Then, by means of the main controller 51, the light-path switching mirror 27 is removed from the light path of the fluorescence, and the excitation laser light is scanned on the specimen S by using the microscope main unit 10, as in the case where the multialkali PMT 31 is used.

The fluorescence generated in the specimen S is collected by the objective lens 19, returns along the light path of the excitation laser light, is transmitted through the dichroic mirror 21, and after being relayed by the relay lenses 23, is incident on the second detection unit 40 without passing via the light-path switching mirror 27.

In the second detection unit 40, the fluorescence is detected by the GaAsP-PMT 41, a light intensity signal is output, the light intensity signal is amplified by the second amplifier 45 and is sent to the main controller 51. Then, image data of the specimen S is obtained by the main controller 51 on the basis of this light intensity signal. The obtained image data is displayed on the monitor 55.

Next, a case where a superresolution image is generated will be described.

In the case where a superresolution image is generated with the specimen observation apparatus 1 according to this embodiment, it is desirable to obtain image data of the specimen S by using the GaAsP-PMT 41, with which little noise is contained in the image data.

In this case, the parameters used for obtaining images, namely, the number of times the image data is added and the scanning method used by the scanner 13 (line scan) are also set by the main controller 51. Then, the excitation laser light is emitted from the light source, and the scanner 13 is controlled by the main controller 13 based on the parameters for obtaining images.

Specifically, the higher-speed galvanometer mirror is repeatedly oscillated in the main scanning direction, and the excitation laser light is repeatedly scanned a prescribed number of times on the same scanning line in the main scanning direction. Once the same scanning line has been scanned the prescribed number of times in the main scanning direction, the lower-speed galvanometer mirror is oscillated to shift the scanning position in the sub-scanning direction, so that the scanning line in the main scanning direction is moved to the next scanning line. This operation is repeated.

By doing so, a plurality of sets of image data for each scanning line in the main scanning direction are obtained by the main controller 51, over the entire region of the specimen S in the sub-scanning direction of the scanner 13. Then, the obtained plurality of sets of image data in the same region on the specimen S are added, and an addition image is generated.

Next, with the main controller 51, the generated addition image is subjected to image computational processing for emphasizing high-frequency components. By doing so, a superresolution image in which superresolution components are visualized is generated.

Here, as the specimen S, when observing cells in which biological molecules are fluorescently labeled, such as biological cellular tissue, an adequate detected light level is not obtained with a single scan, and image data having coarse noise (random noise) superimposed thereon is often obtained. When processing for emphasizing the high-frequency components is applied to this kind of image data, the result is an image in which the noise is emphasized, and it is not possible to obtain a superior superresolution image.

In this embodiment, by obtaining a plurality of sets of image data for the same region on the specimen S and adding these sets of image data using the main controller 51, an addition image whose luminance is increased by virtue of the addition of the image data and having a high proportion of high-frequency components in which the noise is smoothed out is obtained for the same region of the specimen S.

Therefore, with the specimen observation apparatus 1 according to this embodiment, by adding a plurality of sets of image data for the same region and subjecting the generated addition image, serving as a raw image, to image computational processing, it is possible to generate a superior superresolution image in which the high-frequency components in the raw image are efficiently emphasized, so that the superresolution components are visualized.

In addition, by repeatedly scanning the excitation laser light on the same scanning line in the main scanning direction to obtain a plurality of sets of image data, the excitation laser light does not need to continuously irradiate a single point on the biological cellular tissue serving as the specimen S, and it is thus possible to prevent the occurrence of phototoxicity and fluorescence saturation (saturation). Also, the time interval at which the same region is repeatedly scanned does not become excessively long, and it is thus possible to reduce the influence of temporal variations in the cells or temperature drift of the apparatus. Therefore, it is possible to generate a raw image having low noise and a high proportion of high-frequency components.

As a Comparative Example of this embodiment, for example, in the case where the fluorescence from the same region of the specimen S is repeatedly detected in units of single pixels to obtain the image data, since the excitation laser light continuously irradiates a single point on the specimen S, the influence of phototoxicity is noticeable, and in addition, the fluorescent molecules tend to become saturated.

In addition, for example, when the fluorescence from the specimen S is repeatedly detected in units of single image frames to obtain the image data, the influence of temporal variations in the cells or temperature drift of the apparatus becomes large, and the image data changes from frame to frame, even for the same region of the specimen S. Because of this, the raw image obtained by adding up these sets of image data becomes blurred, and it is thus impossible to generate a superior superresolution image.

In this embodiment, it has been assumed that the main controller 51 obtains the image data, obtains the plurality of sets of image data for the same region of the specimen S, performs addition processing of the image data, and performs image computational processing of the addition image. Instead of this, for example, the system control PC 5 may be provided with an image-data obtaining portion that obtains the image data, a control portion that obtains a plurality of sets of image data for the same region of the specimens S by using the image-data obtaining portion, an image-data adding portion that adds the plurality of sets of image data for the same region, and an image computational processing portion that performs image computational processing for emphasizing high-frequency components in the addition image.

This embodiment can be modified in the following ways.

Specifically, in this embodiment, although the aperture 25 is set to an opening diameter slightly smaller than the diameter of the confocal spot, as a first modification, the opening diameter of the aperture 25 may be set, for example, to half the size of the diameter of the confocal spot.

By doing so, only the central part of the beam in the fluorescence that is relayed by the relay lenses 23 passes through the aperture 25, and the surrounding part is blocked by the aperture 25. By doing so, the fluorescence close to the peak at the center of the confocal spot is detected, and therefore, a suitable proportion of high-frequency components are included, and the detection loss can be reduced.

Therefore, with the main controller 51, it is possible to obtain image data having a high proportion of high-frequency components, and it is possible to generate a raw image with a further improved proportion of high-frequency components for the same region of the specimen S. Accordingly, it is possible to generate a superior superresolution image by efficiently emphasizing the high-frequency components in the raw image via image computational processing and visualizing the superresolution components.

As a Comparative Example of this modification, in the case where the opening diameter of the aperture 25 is set to a size substantially equal to the diameter of the confocal spot, although it is possible to detect the fluorescence level in substantially the entirety of the confocal spot with almost no detection loss, the proportion of high-frequency components in the image data is low. Because of this, it is not possible to generate a superior superresolution image.

Also, when the opening diameter of the aperture 25 is set to a size considerably smaller than the diameter of the confocal spot (for example, about ⅛th or less), although the proportion of high-frequency components in the image data increases, it is possible to detect only the fluorescence in just a part of the confocal spot, and the detection loss is high. Because of this, it is not possible to generate a superior superresolution image.

As a second modification, for example, without using the scanner 13, a light source (not illustrated) that generates line-shaped laser light may be used as the light source, and an image-acquisition device (not illustrated) formed in a line shape, which captures the fluorescence from the specimen S irradiated with the line-shaped laser light, may be provided as the image obtaining unit.

In this case, a suitable detector having a spot resolution in the direction of the line of fluorescence, for example, a CCD line camera or an optical multichannel analyzer etc., should be used as the image-acquisition device. Also, the image-acquisition region of the image-acquisition device may be set to about half the width of a linear image corresponding to the confocal spot.

By doing so, the region illuminated in the form of a line by the line-shaped laser light emitted from the light source, via the objective lens 19, can be regarded as being equivalent to a scanning line in the main scanning direction scanned by the scanner 13. Therefore, the fluorescence from the same line-illuminated region on the specimen S is repeatedly detected with the image-acquisition device formed in the shape of a line to obtain a plurality of sets of image data, and by adding the plurality of sets of image data for the same region with the main controller 51, it is possible to easily generate an addition image having a high proportion of high-frequency components without using a scanner.

In this modification, for example, a summing integrator using a TDI (Time Delay Integration) mode disclosed in Japanese Unexamined Patent Application, Publication No. 2006-259377 may be used.

As a third modification, for example, instead of using a scanner 13, a mask (not illustrated) having openings in the shape of periodically arranged slits or pinholes and a driving portion (not illustrated), such as a motor, that rotates the mask at high speed about a center axis may be provided. In addition, a two-dimensional image-acquisition device, such as a CCD (Charged Coupled Devices) or a CMOS (Complementary Metal Oxide Semiconductor) device, which acquires an image of the fluorescence from the specimen S, may be used as the image obtaining portion.

In this case, the mask should be disposed in front of the objective lens 19, and the excitation laser light incident on the objective lens 19 should be restricted by the mask. In addition, the main controller 51 should obtain image data by repeatedly detecting the fluorescence from the specimen S in units of single image frames.

By doing so, by emitting the excitation laser light while rotating the mask at high speed with the driving portion, the laser light that passes through the openings in the mask and that is radiated onto the specimen S by the objective lens 19 is scanned without using the scanner 13. Then, the image data for the scanning region on the specimen S scanned by the laser light is obtained by the two-dimensional image-acquisition device. Accordingly, by adding, with the main controller 51, the plurality of sets of image data for a single frame, obtained by the two-dimensional image-acquisition device, it is possible to easily generate an addition image having a high proportion of high-frequency components.

Although an embodiment of the present invention has been described above with reference to the drawings, the specific configuration is not restricted to this embodiment, and design modifications and so forth that do not depart from the scope of the present invention are also encompassed. For example, the above embodiment has been described using the aperture 25 as an example of the confocal aperture portion; instead of this, however, a plurality of pinholes having different opening diameters may be used. In this case, the pinhole that is disposed in the light path should be switched by means of the main controller 51.

Also, in the embodiment described above, although the main controller 51 simply adds the obtained image data, for example, a Kalman filter, which adds the newly obtained image data to already obtained image data and calculates an average, may be used as the image data addition method.

REFERENCE SIGNS LIST

1 specimen observation apparatus
13 scanner (scanning portion)
19 objective lens
24A confocal lens
25 aperture (confocal aperture portion)
31 multialkali PMT (image-data obtaining portion)
41 GaAsP-PMT (image-data obtaining portion)
51 main controller (image-data obtaining portion, control portion, image-data processing portion, image computational processing portion)
S specimen

The invention claimed is:

1. A specimen observation apparatus comprising:
   an objective lens that radiates laser light emitted from a light source onto a specimen;
   an image-data obtaining portion that is configured to detect return light from the specimen irradiated with the laser light by the objective lens and that obtains an image; and
   a computer that is configured to:
   repeatedly detect the return light from a same region on the specimen with the image-data obtaining portion and obtain a plurality of images for the same region from the repeated detection;
   add the plurality of images for the same region, obtained by the image-data obtaining portion, so as to obtain added image data; and
   subject the added image data, serving as a raw image, to further processing to emphasize high-frequency components in the obtained added image data to generate a superresolution image.

2. The specimen observation apparatus according to claim 1, further comprising:
   a confocal aperture portion that has an opening at a position that is optically conjugate with a focal position of the objective lens; and
   a confocal lens that focuses return light from the specimen irradiated with the laser light by the objective lens and that projects a spot of the return light at the opening position of the confocal aperture portion,
   wherein the opening of the confocal aperture portion has a diameter smaller than the diameter of the spot of return light projected by the confocal lens.

3. The specimen observation apparatus according to claim 1, further comprising:
   a scanner that scans the laser light, irradiated onto the specimen by the objective lens, on the specimen in a main scanning direction and a sub-scanning direction that intersects therewith,
   wherein the computer repeats an operation in which, after the laser light is repeatedly scanned on a same scanning line in the main scanning direction by the scanner for a prescribed number of times, a position thereof in the sub-scanning direction is changed so as to move to a next scanning line, and a plurality of images for the same scanning line are obtained by the image-data obtaining portion.

4. The specimen observation apparatus according to claim 1, further comprising:
   the light source that emits line-shaped laser light,
   wherein the image-data obtaining portion includes an image-acquisition device formed in the shape of a line, which acquires an image of the return light that returns from the specimen irradiated with the line-shaped laser light.

5. The specimen observation apparatus according to claim 1, further comprising:
   a mask that has openings in the shape of slits or pinholes arranged periodically and that restricts the laser light incident on the objective lens; and
   a motor that rotates the mask about a center axis thereof,
   wherein the image-data obtaining portion includes a two-dimensional image-acquisition device that acquires an image of the return light returning from the specimen.

6. A specimen observation apparatus comprising:
   a scanning mirror that scans laser light emitted from a light source on a specimen;
   an objective lens that radiates the laser light scanned by the scanning mirror onto the specimen;
   a light detector that detects return light from the specimen irradiated with the laser light and that outputs a signal according to a light level thereof; and
   a controller that generates an image of the specimen by using the signal output from the light detector,
   wherein the controller performs processing for generating a plurality of images for a same position by controlling the scanning mirror so as to repeatedly scan the laser light a plurality of times at the same position on the specimen, processing for adding the generated plurality of images for the same position to obtain added image data, and processing for subjecting the added image data, serving as a raw image, to further processing to emphasize high-frequency components in the obtained added image data to generate a superresolution image.

7. The specimen observation apparatus according to claim 6,
   wherein the scanning mirror includes at least one galvanometer mirror that deflects the laser light in a main scanning direction and a sub-scanning direction, which intersect each other,
   wherein the controller controls the scanning mirror so as to repeatedly perform an operation in which, after the laser light is repeatedly scanned on a same scanning line in the main scanning direction a prescribed number of times, a position thereof in the sub-scanning direction is changed so as to move to a next scanning line.

8. A specimen observation apparatus comprising:
   an objective lens that radiates excitation light emitted from a light source onto a specimen;
   a mask that is disposed on a light-source side of the objective lens and that has slit-shaped openings or pinholes which are periodically arranged;

a motor that rotates the mask about a prescribed rotation axis;

a two-dimensional image-acquisition device that acquires an image of return light from the specimen irradiated with the excitation light via the rotating mask; and a controller that performs processing for repeatedly obtaining and adding the images of a same region on the specimen, obtained by the two-dimensional image-acquisition device, so as to obtain added image data, and processing for subjecting the added image data, serving as a raw image, to further processing to emphasize high-frequency components in the obtained added image data to generate a superresolution image.

9. The specimen observation apparatus according to claim 1, wherein the image-data obtaining portion includes a multialkali photomultiplier tube.

10. The specimen observation apparatus according to claim 1, wherein the image-data obtaining portion includes a gallium arsenide phosphide photomultiplier tube.

11. The specimen observation apparatus according to claim 1, wherein the image-data obtaining portion includes an image sensor.

12. The specimen observation apparatus according to claim 1, wherein the image-data obtaining portion includes the computer.

13. The specimen observation apparatus according to claim 4, wherein the image-acquisition device includes a CCD line camera or an optical multichannel analyzer.

14. The specimen observation apparatus according to claim 5, wherein the two-dimensional image-acquisition device includes a CCD or a CMOS device.

15. The specimen observation apparatus according to claim 2, wherein the confocal aperture portion comprises an aperture.

16. The specimen observation apparatus according to claim 2, wherein the confocal aperture portion comprises a plurality of pin holes having different diameters and which are switchable by the computer to be selectively disposed at the position that is optically conjugate with the focal position of the objective lens.

17. A specimen observation apparatus comprising:
an objective lens that radiates laser light emitted from a light source onto a specimen;
a scanner that scans the laser light, irradiated onto the specimen by the objective lens, on the specimen;
an image-data obtaining portion that is configured to detect return light from the specimen irradiated with the laser light by the objective lens and that obtains an image; and
a computer that is configured to:
repeatedly detect the return light from a same region on the specimen with the image-data obtaining portion and obtain a plurality of images for the same region from the repeated detection;
add the plurality of images for the same region, obtained by the image-data obtaining portion, so as to obtain added image data; and
subject the added image data, serving as a raw image, to further processing to emphasize high-frequency components in the obtained added image data to generate a superresolution image,
wherein:
the image-data obtaining portion comprises a light detector that detects return light from the specimen and that outputs a light intensity signal according to a light level thereof,
the image-data obtaining portion generates the image data of the specimen by converting the light intensity signal output from the light detector to luminance information for each pixel, according to a scanning position of the scanner, and
the computer performs processing for generating the plurality of images for the same region by repeatedly scanning the laser light a plurality of times at the same region on the specimen.

18. The specimen observation apparatus according to claim 17, further comprising:
a confocal aperture portion that has an opening at a position that is optically conjugate with a focal position of the objective lens; and
a confocal lens that focuses return light from the specimen irradiated with the laser light by the objective lens and that projects a spot of the return light at the opening position of the confocal aperture portion,
wherein the opening of the confocal aperture portion has a diameter smaller than the diameter of the spot of return light projected by the confocal lens.

19. The specimen observation apparatus according to claim 17,
wherein the scanner scans the laser light on the specimen in a main scanning direction and a sub-scanning direction that intersects therewith,
wherein the computer repeats an operation in which, after the laser light is repeatedly scanned on a same scanning line in the main scanning direction by the scanner for a prescribed number of times, a position thereof in the sub-scanning direction is changed so as to move to a next scanning line, and a plurality of images for the same scanning line are obtained by the image-data obtaining portion.

20. A specimen observation apparatus comprising:
a scanning mirror that scans laser light emitted from a light source on a specimen;
an objective lens that radiates the laser light scanned by the scanning mirror onto the specimen;
a light detector that detects return light from the specimen irradiated with the laser light and that outputs a light intensity signal according to a light level thereof; and
a controller that generates an image of the specimen by using the light intensity signal output from the light detector,
wherein the controller performs processing for generating a plurality of images for a same position by controlling the scanning mirror so as to repeatedly scan the laser light a plurality of times at the same position on the specimen to convert the light intensity signal output from the light detector to luminance information for each pixel, according to a scanning position of the scanning mirror, processing for adding the generated plurality of images for the same position to obtain added image data, and processing for subjecting the added image data, serving as a raw image, to further processing to emphasize high-frequency components in the obtained added image data to generate a superresolution image.

21. The specimen observation apparatus according to claim 20, wherein the scanning mirror includes at least one galvanometer mirror that deflects the laser light in a main scanning direction and a sub-scanning direction, which intersect each other,
wherein the controller controls the scanning mirror so as to repeatedly perform an operation in which, after the laser light is repeatedly scanned on a same scanning line in the main scanning direction a prescribed number of times, a position thereof in the sub-scanning direction is changed so as to move to a next scanning line.

22. The specimen observation apparatus according to claim 1, wherein:
said same region on the specimen is one of a plurality of regions on the specimen which together form an entire region of the specimen to be imaged; and
the computer is configured to:
repeatedly detect return light from each of said plurality of regions, respectively, and obtain, for each same region among the plurality of regions, a plurality of images from the repeated detection;
respectively add the plurality of images for said each same region, obtained by the image-data obtaining portion, so as to obtain added image data for said each same region; and
subject the added image data, serving as a raw image, to further processing to emphasize high-frequency components in the obtained added image data for said each same region to generate the superresolution image.

* * * * *